United States Patent
Enders et al.

(10) Patent No.: US 6,874,811 B2
(45) Date of Patent: Apr. 5, 2005

(54) EXPANDABLE RIGID KNEE AIRBAG SYSTEM

(75) Inventors: Mark L. Enders, Pleasant View, UT (US); Robert J. Hays, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/193,411

(22) Filed: Jul. 11, 2002

(65) Prior Publication Data

US 2004/0007856 A1 Jan. 15, 2004

(51) Int. Cl.[7] .............................................. B60R 21/22
(52) U.S. Cl. ................................. 280/730.1; 280/752
(58) Field of Search ............................. 280/730.1, 750, 280/751, 752; 296/70

(56) References Cited

U.S. PATENT DOCUMENTS

| | | | | |
|---|---|---|---|---|
| 3,617,073 A | * | 11/1971 | Landsman et al. | 280/734 |
| 5,816,613 A | * | 10/1998 | Specht et al. | 280/753 |
| 5,868,422 A | | 2/1999 | Galbraith et al. | 280/732 |
| 5,904,367 A | * | 5/1999 | Warnez et al. | 280/728.3 |
| 6,039,380 A | | 3/2000 | Heilig et al. | 296/70 |
| 6,302,437 B1 | * | 10/2001 | Marriott et al. | 280/732 |
| 6,378,898 B1 | * | 4/2002 | Lewis et al. | 280/733 |
| 6,471,242 B2 | * | 10/2002 | Schneider | 280/732 |
| 6,536,802 B1 | * | 3/2003 | Sutherland et al. | 280/752 |

FOREIGN PATENT DOCUMENTS

GB          2357466          6/2001          B60R/21/20

* cited by examiner

Primary Examiner—Faye M. Fleming
(74) Attorney, Agent, or Firm—Sally J. Brown

(57) ABSTRACT

An inflatable rigid knee airbag system for assisting in positioning and decelerating a vehicle occupant is disclosed. The system includes an inflatable knee airbag having a front panel, an annular, accordion-folded bellows panel, and a rear panel having an inflation orifice and mounting brackets; and a pyrotechnic inflator. The system helps to improve the kinematics of a vehicle occupant in relation to a primary airbag cushion by bolstering the knees of the occupant. The system of the invention may be mounted in a vehicle in a panel under the steering column, in the door of a glove box, or in the lower section of the instrument panel of the vehicle directly in front of the occupant's lower legs.

45 Claims, 6 Drawing Sheets

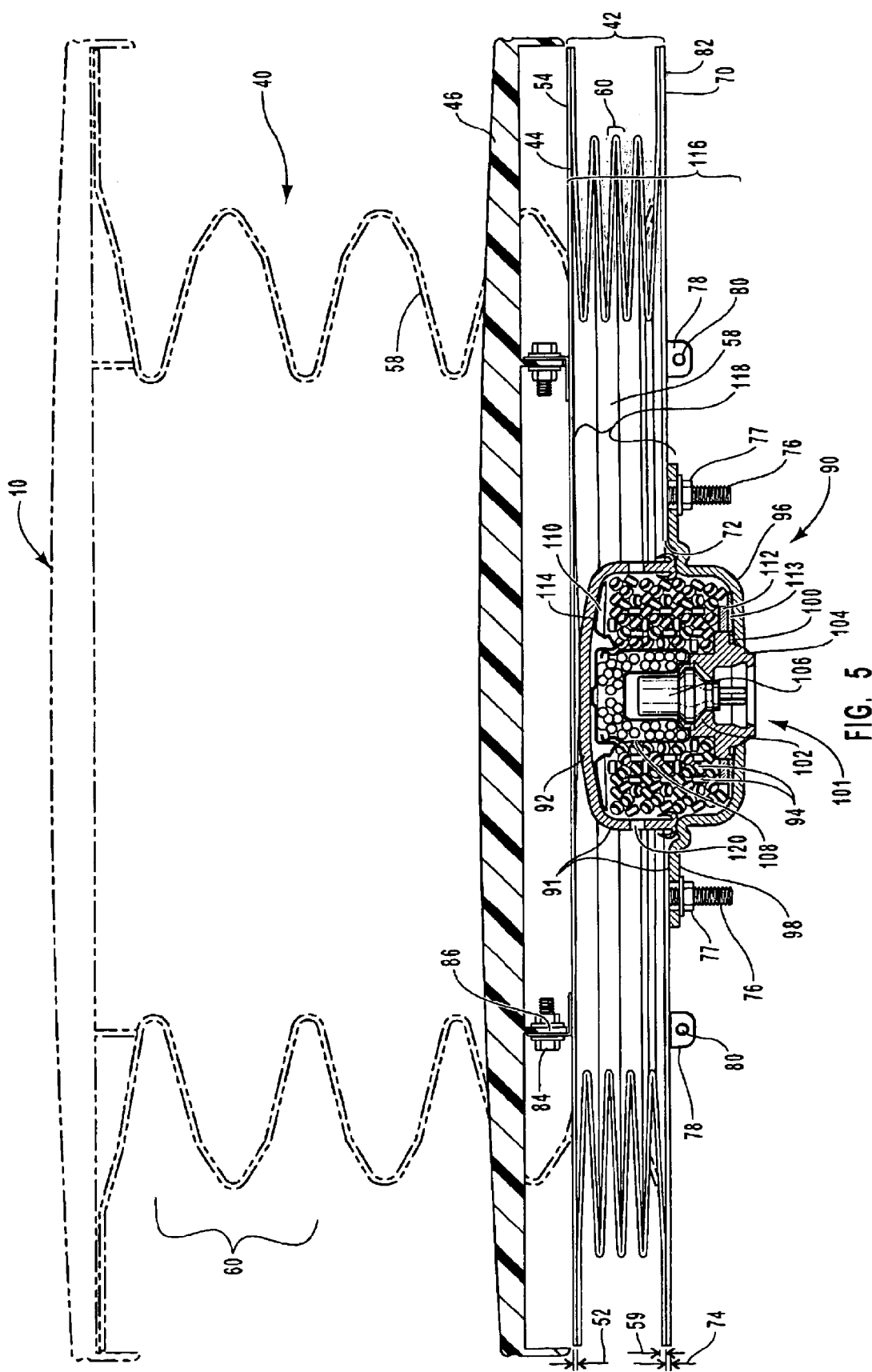

EXPANDABLE RIGID KNEE AIRBAG SYSTEM

BACKGROUND OF THE INVENTION

1. Field of the Invention

The present invention relates to inflatable airbags for protecting vehicle occupants during collision events. More specifically, the present invention relates to an expandable rigid knee airbag system that facilitates proper occupant positioning in order to reduce lower leg and other injuries in vehicle collisions.

2. Description of Related Art

Inflatable airbags enjoy widespread acceptance as passive passenger restraints for use in motor vehicles. This acceptance has come as airbags have built a reputation of preventing numerous deaths and injuries over years of development, testing, and use. Studies show that in some instances, the use of frontally placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life-saving potential of airbags and the need to encourage their use, production, and development.

As a result in part of benefits such as those described above, automakers are now required to install airbags in most new vehicles manufactured for sale in the United States. Many automobile manufacturers have turned this airbag technology requirement into a marketing tool. Enticed by the promise of added safety, vehicle purchasers frequently seek out vehicles with sophisticated airbag systems.

Airbags are often installed in the steering wheel and in the dashboard on the passenger side of a car. These airbags are generally large and thick. They are used for the primary deceleration of a vehicle occupant since, in a large fraction of collisions, the occupant is accelerated forward through the vehicle. Such airbags are generally housed within the dashboard, steering wheel, or other similar interior panels of a vehicle, and are covered by a trim cover panel. The trim cover panel covers the compartment that contains the airbag module. Such airbag covers are typically made of rigid plastic, and are configured to be opened by the pressure created by the deploying airbag. During deployment of the airbag, it is preferable to retain the airbag cover in at least partial attachment to the vehicle to prevent the airbag cover from flying loose in the passenger compartment. If the airbag cover were allowed to detach and freely move into the passenger compartment, it could cause injury to a passenger.

Airbags may be mounted in vehicular panels near the steering wheel, in the region or components of the glove box, in vehicle doors, along vehicle roof rails, walls, vehicle floors, or beneath a dashboard to provide deceleration in specific types of collision events.

Airbags are generally linked to a control system within the vehicle that triggers their initiation when a collision occurs. Generally, an accelerometer within the vehicle measures the abnormal deceleration caused by the collision event and triggers the ignition of an airbag inflator. This control system is often referred to as an electronic control unit (or "ECU"). The ECU includes a sensor that continuously monitors the acceleration and deceleration of the vehicle and sends this information to a processor which processes it using an algorithm to determine whether a deceleration experienced by the vehicle is a collision or not.

When the processor of the ECU determines, based on a set of pre-determined criteria, that the vehicle is experiencing a collision, the ECU transmits an electrical current to an initiator assembly connected to an inflator that is coupled to the airbag module. The initiator activates the inflator. An inflator is a gas generator that typically uses a compressed or liquefied gas or a mixture of gases, a solid fuel, or some combination of the two, to rapidly generate a large volume of inflation gas. The gas is then channeled, often through a segment of specialized tubing called a gas guide. The gas inflates the airbag, thus placing it in the path of the vehicle occupant and allowing it to absorb the impact of the vehicle occupant.

As experience with the manufacture and use of airbags has progressed, the engineering challenges involved in their design, construction, and use have become better understood. First, most airbag systems are designed to rapidly inflate and provide a cushion in front of or alongside an occupant based on a presumption that the occupant will be in a predetermined position. Problems have been noted to occur when the occupant is "out of position" in regard to this presumed placement when a collision event occurs and the airbag deploys. Similarly, problems may occur when the occupant, though possibly at first in the predicted position, strikes a glancing blow to the airbag, and is then deflected out of the airbag before proper deceleration can occur.

Out of position injuries may be attributed in part to the fact that most airbag systems have been primarily designed for deployment in front of the torso of an occupant. More specifically, such airbags are disposed for deployment between the upper torso of an occupant and the windshield and instrument panel. During a front-end collision, there is a tendency for an occupant, particularly one who is not properly restrained by a seat belt, to slide forward along the seat. This results in poor kinematics and positioning when the occupant interacts with a frontal airbag such as a driver's side or passenger's side airbag.

In order to avoid such dangers to occupants, knee airbag systems have been developed. These airbags deploy during a collision event and engage an occupant's knees or lower legs. This holds the occupant in place on the seat, and improves the kinematics of the occupant.

Such knee airbag systems include a knee airbag and a panel, referred to as a knee bolster panel, which is disposed in front of the knee airbag. The knee bolster panel provides a more rigid surface area than an airbag would alone to better engage and decelerate the knees or legs of an occupant and thereby restrain the occupant's lower body. Additionally, the knee bolster panel allows some degree of deformation to minimize the impact to an occupant.

Such knee bolster airbag systems, like many other airbag systems, suffer from high cost and engineering problems. Specifically, knee bolster airbags are difficult to design to be mounted in the tight spaces available under the steering column or dashboard in order to be properly positioned to contact a vehicle occupant's knees. Further, many current knee airbag systems use an inflator located at a remote location. Such systems require the use of costly gas guides suitable for conducting hot inflation gases from the inflator to the airbag. Additionally, the airbags themselves must be treated with various coatings to protect the fabric of the airbag itself from the heat of the gas. Yet further, airbag inflators must be made to include baffles and filters to act as heat sinks for the inflation gas of the inflator. These elements add bulk to the inflator, thus increasing its space requirements, and also add expense to the cost of the inflator. Finally, in some specific applications, such as mounting an airbag in the door of a glove box of a vehicle, fabric airbags have proven very difficult to install.

It is thus understood that it would be an advancement in the art to provide an expandable rigid knee airbag system to protect a vehicle occupant in collision events in a wide variety of situations. Specifically, it would be an advancement in the art to provide a knee airbag suitable for mounting in a vehicle under the steering column or dashboard, including mounting in a glove box door. Additionally, it would be an advancement in the art to provide a knee airbag system with heat resistance to allow the use of a low-cost pyrotechnic inflator and permit direct mounting of the inflator to the airbag and to avoid the expense added to an airbag system by gas guides, inflator baffles, and inflator filters. Such a device is disclosed and claimed herein.

SUMMARY OF THE INVENTION

The apparatus of the present invention has been developed in response to the present state of the art, and in particular, in response to the problems and needs in the art that have not yet been fully solved by currently available knee bolster airbag systems. Thus, it is an overall objective of the present invention to provide an inflatable rigid knee airbag system to assist in protecting and properly positioning a vehicle occupant during a collision event. To achieve these objectives, in accordance with the invention as embodied and broadly described herein, an inflatable rigid knee airbag system is provided.

The inflatable rigid knee airbag system of the invention includes an expandable rigid knee airbag and an inflator. The expandable rigid knee airbag has a front panel, a bellows panel, and a rear panel with an inflation orifice. The inflator may be a pyrotechnic inflator attached to the inflation orifice of the back panel of the rigid knee airbag.

The front panel of the inflatable rigid knee airbag system of the invention is adapted for easy and aesthetic integration into a vehicle. Specifically, the front panel of the knee airbag may include a decorative cover panel for use as a knee bolster. This decorative cover panel may be a glove box door for use in protecting a vehicle occupant in the front passenger seat. Additionally, the decorative cover panel may be a contoured panel suitable for placement under the steering column or dashboard of a vehicle. This allows the airbag to be easily integrated into vehicle designs, and gives vehicle manufacturers a valuable option for increasing occupant safety.

The bellows panel of the expandable rigid knee airbag of the invention may be constructed in any of a number of suitable shapes, including elliptical, cylindrical, and substantially rectangular. The bellows panel may be made of at least one rigid sheet of metal, plastic, or any other sufficiently rigid material having at least one accordion fold. The sheet may be folded, curved, notched, and even joined to another sheet to form an annulus. The bellows panel of the invention may be made multiple rigid sheets, each having at least one accordion pleat, and each being operably joined to at least one other sheet, the combination forming an annulus.

The bellows panel of the expandable rigid knee airbag system of the invention includes accordion folds to allow expansion of the airbag in front of a vehicle occupant's knees. Positioning the airbag thus helps to properly position the occupant during the impact and also to provide deceleration to the occupant by deforming when the occupant strikes the rigid airbag. The bellows panel may comprise at least one accordion fold to allow airbag expansion upon activation of the inflator. Alternatively, the bellows panel may include at least four accordion folds to allow proper airbag expansion.

The accordion pleats of the bellows panel of the invention may be configured to provide capacity to the airbag to expand and increase the thickness of the airbag by from about ½ inch to about an additional 12 inches. More preferably, the bellows panel of the airbag of the invention may be configured to expand to increase the thickness of the airbag by from about 2 inches to about 8 inches. Still more preferably, the bellows panel of the airbag of the invention may be configured to expand to increase the thickness of the airbag by from about 4 inches to about 6 inches.

The rear panel of the inflatable rigid knee airbag system of the invention may be configured to serve both as a mounting panel to attach the airbag to the vehicle and to attach the inflator to the airbag. Additionally, the rear panel may serve as a reaction surface for the inflation charge and resulting gas to push the front panel outward. As such, the thickness of the material of the rear panel may thus be selected to be greater than the thickness of the front panel and the thickness of the bellows panel of the airbag of the invention. Further, the rear panel may include an inflator hole for allowing the insertion and mounting of the inflator, and may additionally include a ring of connector studs for attaching the inflator to the airbag. The inflator hole may preferably be located in a central region of the rear panel. Further, the inflator hole is sized to accommodate the diffuser chamber of the inflator. The airbag may further have at least one mounting bracket to facilitate the mounting of the airbag to the vehicle for use. The mounting brackets may include holes to aid in mounting the airbag. In an example of this, the mounting brackets may include at least one hole of from about 0.5 to about 0.25 inches in diameter.

The inflatable rigid knee airbag system of the invention also includes an inflator capable of expelling inflation gas of a volume and at a pressure sufficient to inflate the rigid knee airbag upon activation of the inflator. The inflator of the invention may be mounted directly to the airbag such that the diffuser portion of the inflator is housed inside the airbag. The airbag is composed of metal, plastic, or other rigid, heat-resistant materials. In those airbags being composed of metal, the airbag of the invention may function as a heat sink for the inflator by dissipating heat produced by the generation of the inflation gases in the inflator. Current fabric airbags function very poorly as heat sinks for high-temperature gases, and may, indeed, be susceptible to damage from such gases. As a result of this, the inflator may be mounted directly to the metal airbag of the invention, and the inflator itself may be simplified by the omission of components such as baffles and filters whose function is primarily to cool inflation gas, with the airbag taking the place of these baffles and filters.

In preferred expandable rigid knee airbag systems according to the invention, the airbags are configured to be inflated by a highly pressurized gas, and then to have remaining internal gas pressure rapidly reduced to substantially ambient gas pressures. In rigid airbags that are not configured to substantially dissipate inflation pressure before the vehicle occupant contacts the airbag, the deceleration of the occupant may be too rapid, causing the occupant to experience as much as 40 g's of force upon impact with the airbag.

Alternatively, in airbags of the invention configured to provide an ambient internal pressure, the deformation of the rigid material of the airbag provides substantially all of the deceleration of the vehicle occupant, providing a much softer airbag than the pressurized rigid bag. In some of the airbags of the invention, the lack of residual inflation pressure reduced the occupant's deceleration to 20 g's. The initial inflation gas may have a pressure of from about 40 psi to about 60 psi, more preferably of from about 45 psi to 55 psi, and most preferably, of about 50 psi. Then, by means of venting, the airbag will return to almost ambient pressure.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a cutaway view of the inflator of FIG. 3 shown in its compact formation, and also shown in its inflated configuration in phantom.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the apparatus, system, and method of the present invention, as represented in FIGS. 1 through 6, is not intended to limit the scope of the invention, as claimed, but is merely representative of presently preferred embodiments of the invention.

Figure 1:
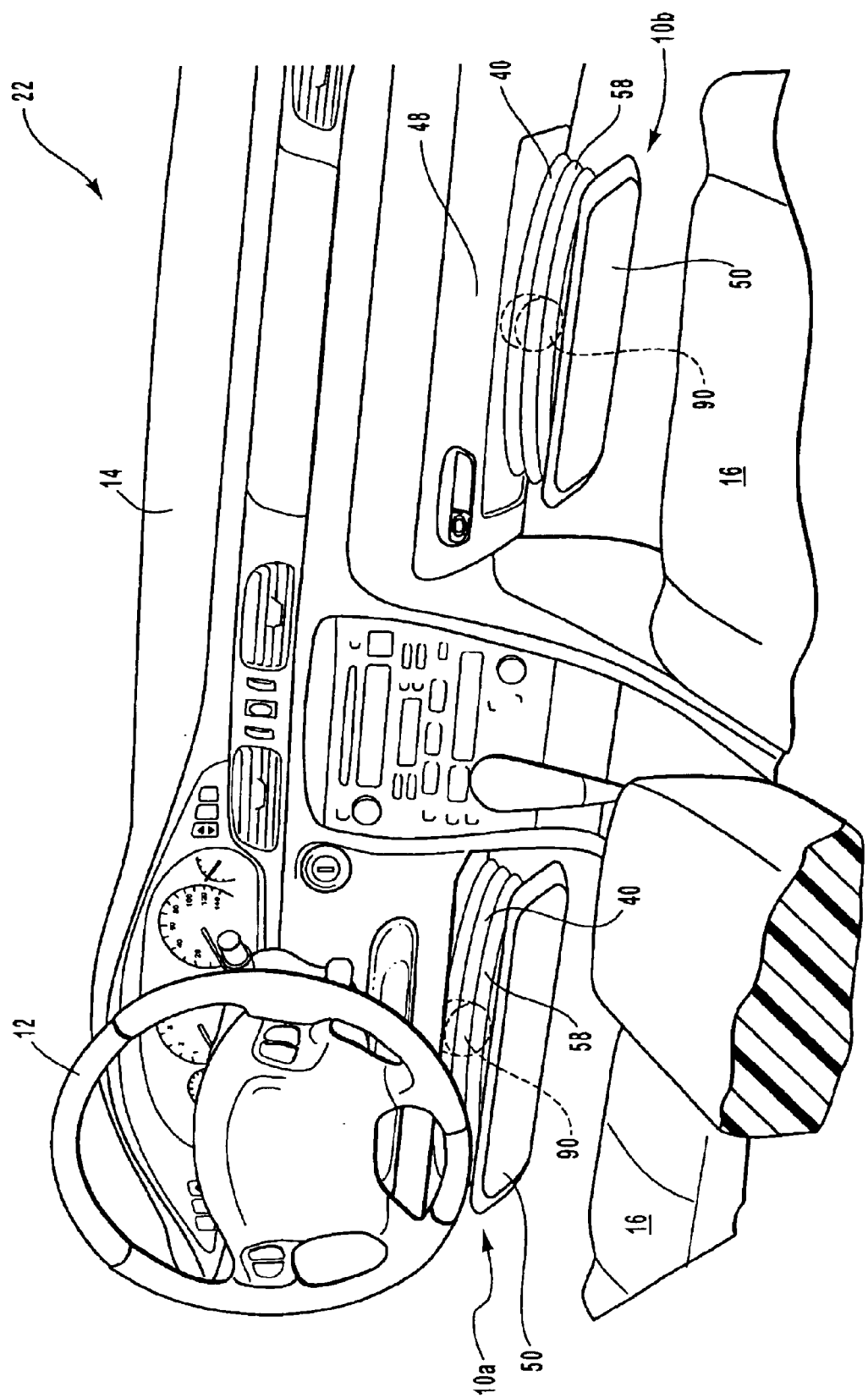
FIG. 1 is a perspective view of inflatable rigid knee airbag systems according to the invention shown mounted in a vehicle and inflated.

Referring now to FIG. 1, expandable rigid knee airbag systems 10a and 10b of the invention are shown mounted and inflated in a vehicle 22. A first expandable rigid knee airbag system 10a is shown placed under the steering wheel 12 of the vehicle 22 and inflated. A second expandable rigid knee airbag system 10b is shown mounted in the glove box door 48 of the glove box 20 in the passenger's side of the vehicle 22 under the dashboard 14 and inflated. Vehicles may be configured to comprise multiple expandable rigid knee airbag systems 10a, 10b. Additionally, vehicles 22 may include a single integrated control system to control the behavior of each of the multiple airbags systems 10a, 10b, or alternatively, may include several separate control systems, each regulating at least one airbag.

The rigid knee airbags 40a, 40b shown mounted in the vehicle 22 are generally elliptical in shape. Here, the bellows panels 58 are elliptical and the front panels (not shown) are covered by interior panels 50. Alternatively, however, the rigid knee airbags 40 of the system 10 may be substantially circular or substantially rectangular in shape. In FIG. 1, these airbags are shown inflated such that they are in position to protect an occupant during a collision event. The airbags 10a, 10b are inflated by inflators 90 (shown in phantom).

Figure 2:
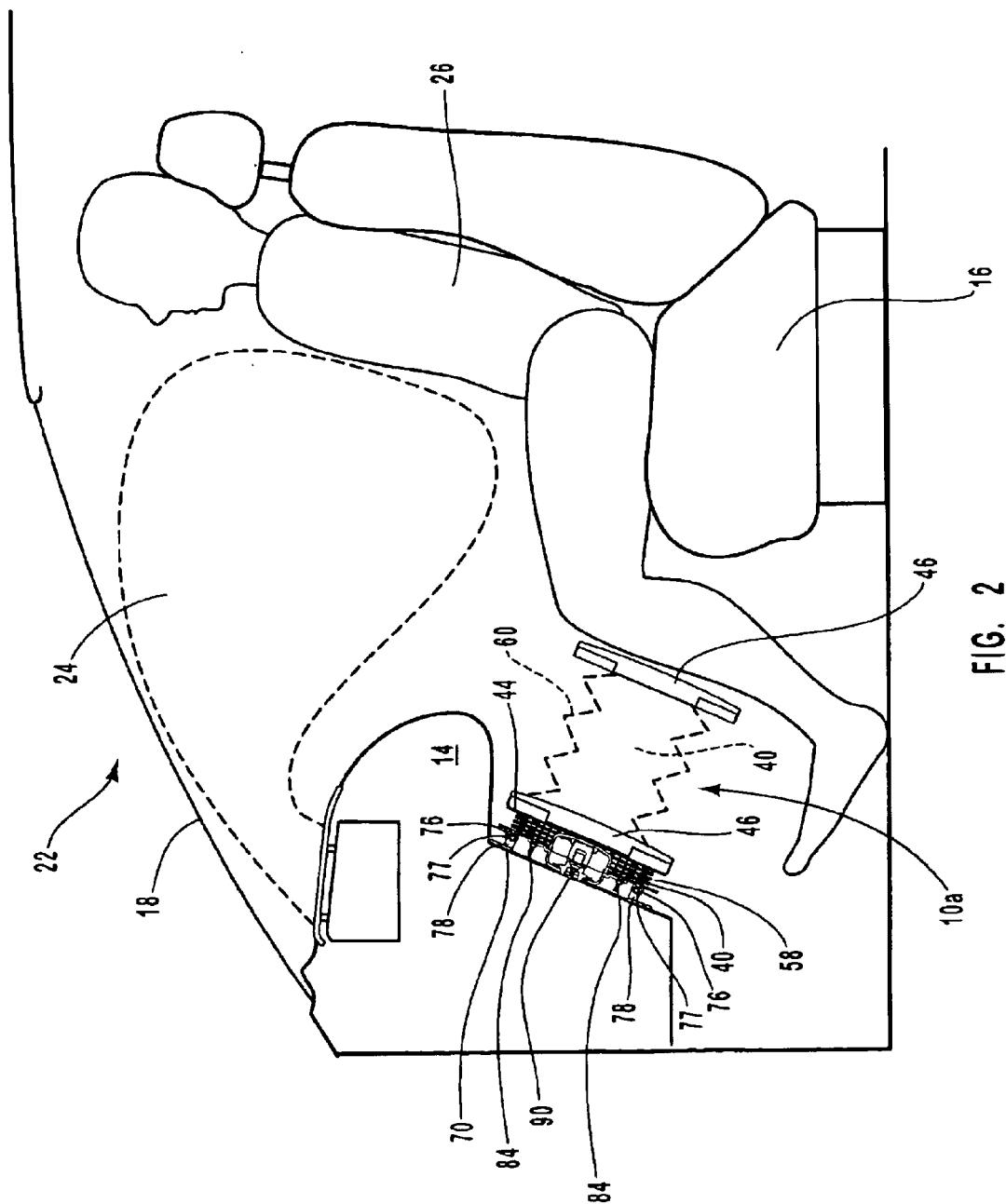
FIG. 2 is a cross-sectional schematic view of an inflatable rigid knee airbag system, shown installed in a vehicle and inflated in phantom.

Referring now to FIG. 2, a cutaway view of an inflatable rigid knee airbag system is shown installed in a vehicle and inflated in phantom. Here, a vehicle occupant 26 is shown seated in a front seat 16. A primary airbag 24 is shown mounted in a dashboard 14 and inflated (shown in phantom) between the occupant 26 and a windshield 18 of the vehicle 22. In this cross-sectional view, the rigid knee airbag system 10 of the invention comprises an airbag 40.

The airbag 40 first includes a front panel 44, which is attached to a decorative trim panel 46. This decorative cover, or trim panel 46, serves as a knee bolster for contacting the knees of an occupant, as well as allowing the airbag to be made to be easily integrated into the interior of the vehicle 22. The front panel 44 is also connected at its periphery to a bellows panel 58 by a front peripheral seam (not shown). The bellows panel 58 is, in turn, connected to a rear panel 70 by a rear peripheral seam (not shown). The airbag 40 is attached to the inflator 90 by connectors 84 through rear panel 70. The system 10 is attached to the vehicle 22 by a mounting bracket 78 with connector studs 76 and a bolt 77. Here, the bellows panel 58 of the airbag 40 is shown in its deflated, or compact, configuration. When inflated (as is shown in phantom) the front panel 44 and the attached trim panel 46 are placed in front of the knees of a vehicle occupant 26 to contribute to the energy absorption system of the automotive safety devices of the vehicle.

Figure 3:
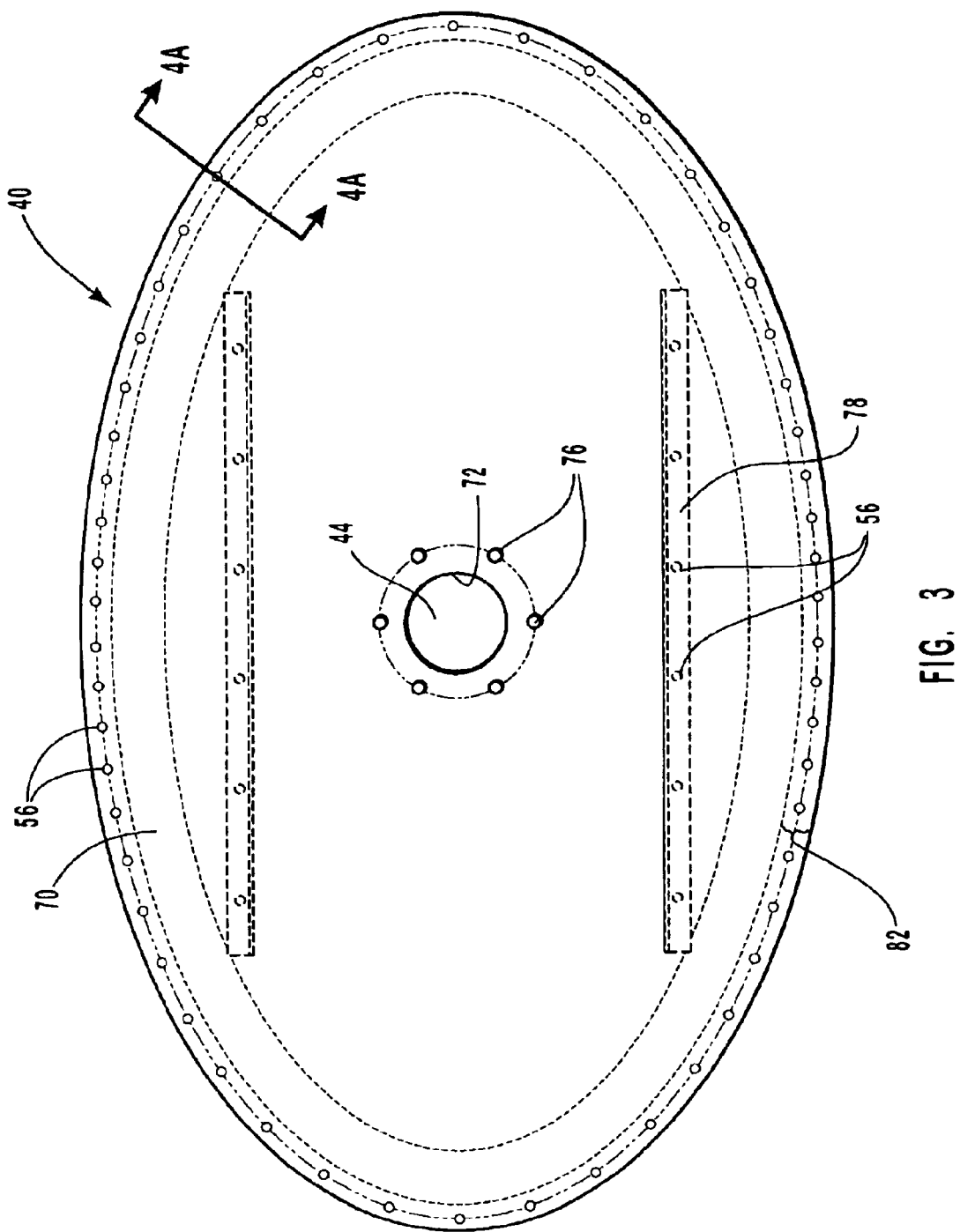
FIG. 3 is a rear plan view of the inflatable rigid knee airbag system of the invention in its compact conformation.

Referring now to FIG. 3, a perspective rear view of the inflatable rigid knee airbag 40 of the invention is shown in its compact conformation. The rear panel 70 is clearly shown having mounting brackets 78 attached to the rear panel 70 by spot welds 56. These mounting brackets 78 facilitate the attachment of the airbag system to a vehicle.

The rear panel 70 also includes an inflation orifice 72, through which the diffuser portion of an inflator may be inserted. The orifice may alternatively be sized to receive another part of an inflator for the transmission of inflation gases. The orifice 72 is surrounded by connector studs 76 for attaching the inflator. The front panel 44, visible here through the inflation orifice 72 of the airbag 40 comprises a rigid material such as a sheet of metal attached to a bellows panel (not shown) which is attached to the rear panel 70 by spot welds 56. Other welding methods for joining metal components could also be employed. These might include continuous welding, laser welding or brazing. Still another method of joining the parts together could be crimping and bending metal parts together, as is common in the industries such as the beverage can industry.

Figure 4A:
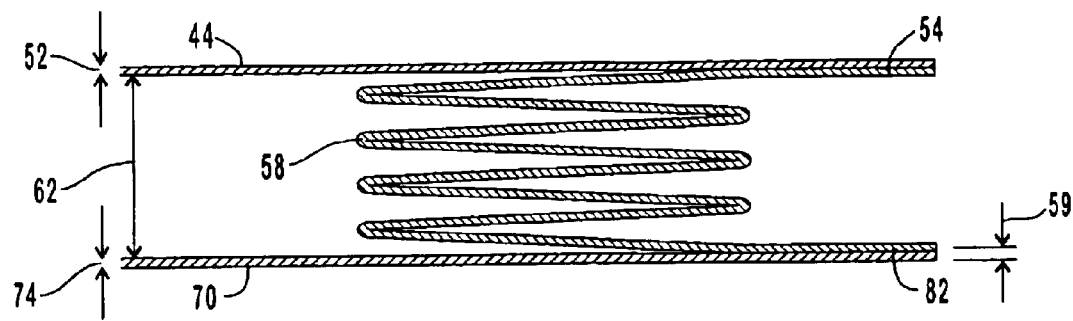
FIG. 4A is a cross-sectional view of a portion of the inflatable rigid knee airbag system of FIG. 3 taken at line 4A.
Figure 4B:
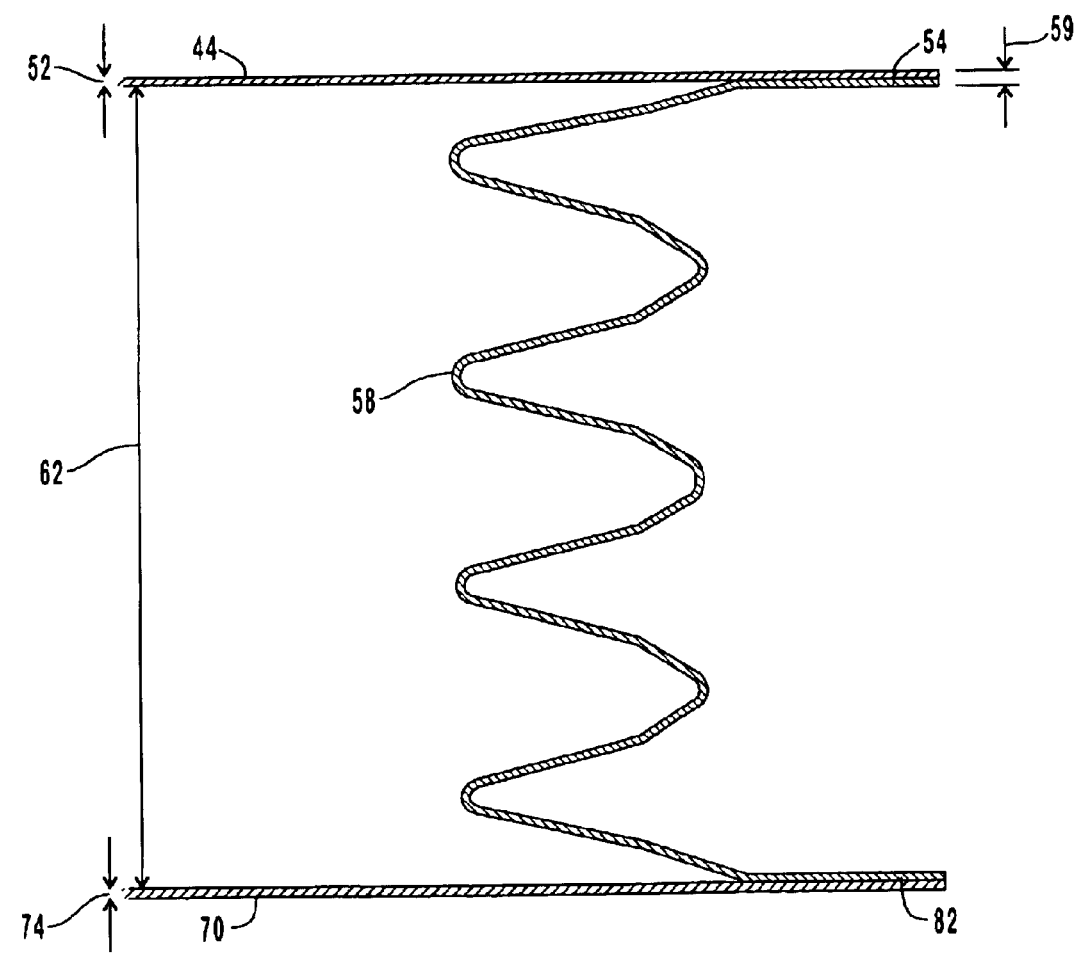
FIG. 4B is a cross-sectional view of a portion of the inflatable rigid knee airbag system of FIG. 3 taken at line 4A, shown in its inflated configuration.

FIG. 4 shows three cross-sectional views of a portion of the inflatable rigid knee airbag 40 of FIG. 3 taken at line 4A—4A. FIG. 4A shows the airbag 40 in its compact configuration. The front panel 44, shown here without a decorative cover panel 46 for clarity, is attached to bellows panel 58. The bellows panel 58 is shown to comprise a sheet of metal of between about 16 and about 32 U.S. standard gauge. This panel enables the airbag to bolster the knees of a vehicle occupant while being lightweight. This is desirable to allow a vehicle occupant can push the airbag aside to exit the vehicle after deployment and use. In the configuration of FIG. 4A, the bellows panel thickness 62 is minimized. FIG. 4B is a cross-sectional view of the airbag of FIG. 3 taken at line 4A—4A, shown here in its inflated configuration with the bellows portion expanded.

Figure 4C:
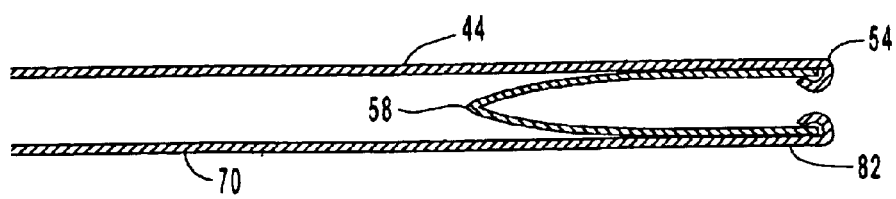
FIG. 4C is a cross-sectional view of an alternative embodiment of a portion of the inflatable rigid knee airbag system of FIG. 3 taken at line 4A.

FIG. 4C shows a variation on FIGS. 4A and 4B wherein the bellows panel 58 has only one accordion fold. Additionally, FIGS. 4A and 4B show a front peripheral seam 54 on front panel 44 and a rear peripheral seam 82 on rear panel 70, which are suited for spot-welding or other attachment methods. FIG. 4C shows a variation in which folding of the rigid material of the airbag components at front peripheral seam 54 and rear peripheral seam 82 retains the components in place. Such folding to secure the panels of the invention to each other is especially suited to airbags constructed of metal.

Referring now to FIG. 5, a cutaway view of the system 10, including airbag 40 of FIG. 3 is shown in its compact formation with an inflator 90 attached. The inflated configuration of the airbag 40 is shown in phantom. Here, the airbag 40 is shown having a front panel 44 attached to a decorative cover panel 46 such as a glove box door or an interior panel. This attachment may be accomplished using front mounting brackets 86 and connectors 84. These front mounting brackets 86 may be attached to the front panel 44 using a variety of means appropriate to the material used including spot welding and brazing. There are a number of other fastening design means available for attaching the cover panel 46 to the front panel 44. These include rivets, snap-fitting devices and thermoplastic welding methods.

The decorative cover panel 46 may have a wide variety of configurations to enable aesthetic integration of the airbag 40 into the interior of the vehicle 22. Such decorative cover panels 46 also function as knee bolster panels attached to the airbag 40 that are configured to contact the knees of a vehicle occupant. As such, they may comprise a material that may deform on contact to bolster the occupant's knees without causing injury. This supports the occupant during the rapid forward acceleration the vehicle occupant may experience during a collision event. When the airbag inflates, the molded decorative panel 46 is positioned near an occupant's knees by the inflation of the airbag 40. Contact of the occupant with the decorative panel 46 causes deformation of the airbag 40, and possibly of the decorative panel 46, thus dissipating energy while substantially maintaining the position of the vehicle occupant. This helps the vehicle occupant to remain properly upright in the seat and improves the kinematics of the occupant under an inflated primary airbag such as an airbag mounted in the upper dashboard or steering wheel of a vehicle.

This front panel 44 may be contoured to fit the decorative cover panel 46 or may simply be flattened. Around the periphery, or edges, of the front panel 44 is a front peripheral seam 54 that connects the front panel 44 to the bellows panel 58 that provides for expansion of the airbag. The decorative cover 46 could be produced by a number of known arts, such as injection-molded thermoplastics, or a skin and foam molding process commonly employed for the automotive industry's interior trim production.

The bellows panel 58 of the airbag 40 is a tubular structure generally shaped to conform to the shape of the front panel 44, and attached to the front panel 44 at the front peripheral seam 54. This seam may be a brazed seam, or preferably may comprise a plurality of spot welds (not shown). Additionally, the bellows panel includes at least one accordion pleat 60 such that prior to activation, the bellows panel 58 may be folded in a compact configuration.

The bellows panel 58 may comprise a single sheet of a rigid material such as a metal rolled and pleated to the proper configuration, or may alternatively comprise multiple panels of the rigid material curved and shaped using methods known in the art to make up the bellows panel 58.

The expandable rigid knee airbag 40 of the invention further comprises a rear panel 70 similarly made of a rigid material. This rear panel is in some presently preferred embodiments composed of a metal sheet having a thickness 74 greater than the thickness of the material of the front panel 52 or the thickness of the bellows panel 59. This serves to allow the rear panel 70 of the airbag 40 to be used additionally as a mount for the airbag 40 with or without mounting brackets 78, and as a reaction base for inflator gases. The rear panel 70 is attached to the bellows panel 58 by a rear peripheral seam 82, which, similar to the front peripheral seam 54, may comprise a brazed seam or a seam consisting of a plurality of spot-welds (not shown).

The rear panel 70 of the air bag also has an inflator orifice 72, which allows for the inflator 90 of the system 10 of the invention to be mounted directly to the airbag 40, in some cases by a ring of connector studs 76. Additionally, the rear panel 70 may either be directly mounted to a vehicle, or it may include at least one attached mounting bracket 78 for mounting the airbag to the vehicle 22. This mounting bracket 78 may include at least one mounting bracket hole 80 for attaching the expandable rigid knee airbag 40 to a frame or other secure portion of a vehicle 22.

FIG. 5 further shows a cutaway view of an inflator suitable for use in the invention. The inflator 90 of the invention is suitable for use with airbags of the invention. Specifically, inflator 90 comprises a housing 91 that may include a diffuser chamber 92 attached to a base plate 96. The housing 91 encloses a gas generant 94, often in an extruded form, and the initiator assembly 101.

The initiator assembly 101 is made up of a central initiator 106, which is situated in an initiator adaptor 104 in a sealed manner due to the presence of initiator seal 102. The seal may also include a seal washer 100. Initiator adaptor 104 is mounted to the base plate 96, which is mounted to the rear panel 70 of the airbag 40 through a base plate flange 98 by connector studs 76. The inflator of the invention may also include first, second, and third damper pads 110, 112, and 113 disposed within the housing of the initiator assembly 101. This inflator differs from those currently known in the art in that it does not require the use of baffles and/or filter assemblies commonly required in airbag inflators to dissipate heat and prevent heat-related damage to the airbag during inflation.

The housing 91 further includes exit nozzles 120 through which the inflation gases produced by the extruded gas generant exit after initiation of the inflator. In the expandable rigid knee airbag system 10 of the invention, the inflator 90 is mounted in the inflator orifice 72, (172 in FIG. 6) of the rear panel 70. The inflator may be mounted using connector studs 76.

Airbag inflators suitable for use with the invention may include other pyrotechnic inflators, including those inflators configured to cool inflation gas prior to its emission from the inflator. In addition, the invention may be adapted for use with gaseous and hybrid-type gas generators.

Figure 6:
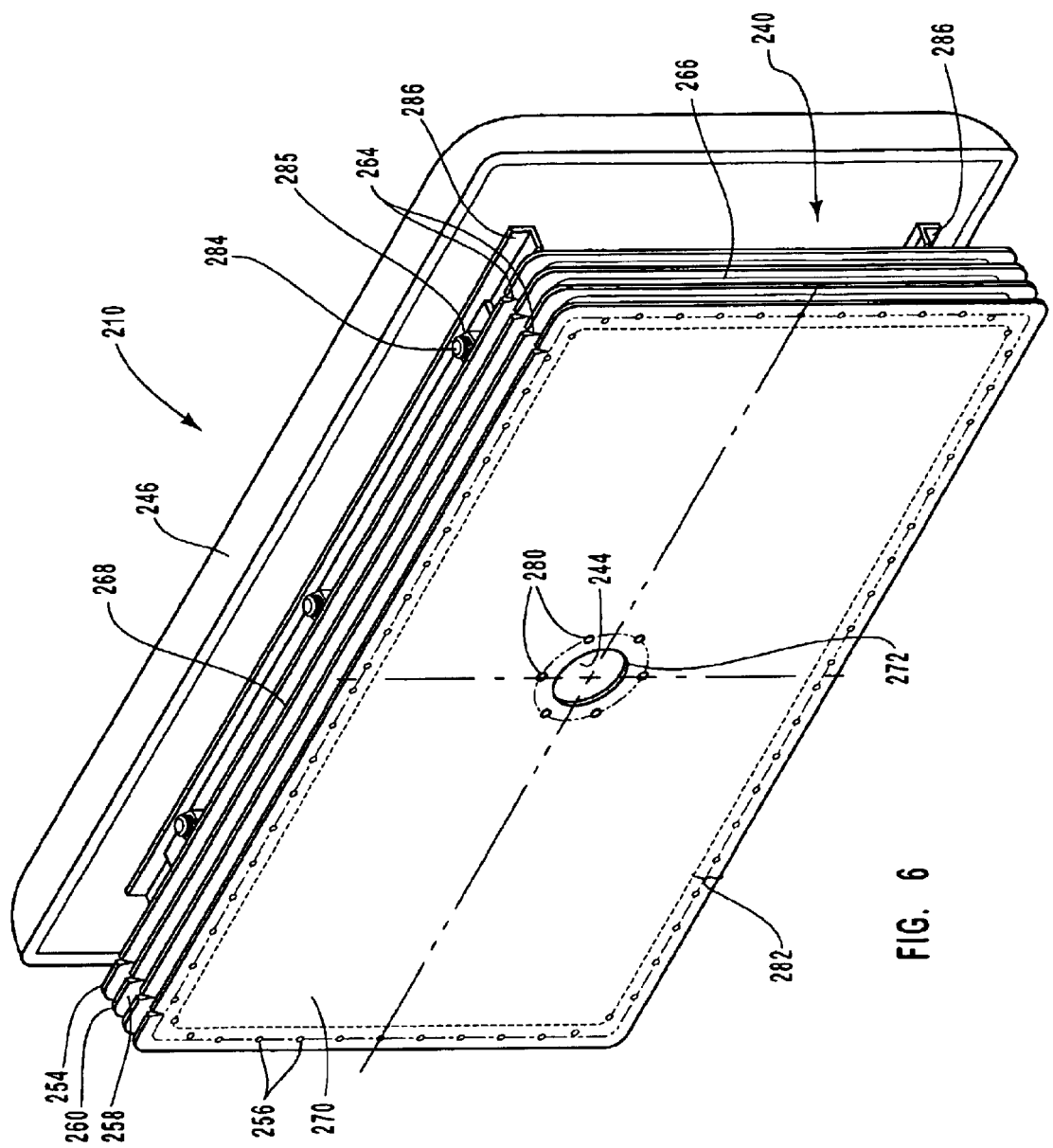
FIG. 6 is a perspective rear view of an alternate inflatable rigid knee airbag system of the invention in its compact configuration.

FIG. 6 shows another expandable rigid knee airbag system 210 including airbag 240 and decorative cover panel 246, but excluding the inflator for clarity. As in the airbag 40 of FIGS. 3–5, airbag 240 comprises a front panel 244, a bellows panel 258, and a rear panel 270. The front panel 244 is attached to the bellows panel 258 by a front peripheral seam 254. Similarly, the rear panel 270 is attached to the bellows panel 258 by a rear peripheral seam 282, here comprising spot welds 256. The bellows panel 258 comprises multiple accordion folds 260, here shown with two complete folds.

The bellows panel 258 is shown to be constructed of straight panels 268 and end pieces 266, joined at bellows joints 264, which may include a hinge. The rear panel 270 may have mounting brackets (not shown), attached using methods known in the art, as illustrated previously. Additionally, the rear panel 270 has an inflation orifice 272, here ringed with mounting holes 280. This provides an alternative mounting scheme to those shown in previous figures.

The device shown in FIG. 6 further includes a decorative cover panel 246, such as a molded interior vehicle panel, which is attached to the airbag 240 by front mounting brackets 286. In this Figure, the front mounting brackets 286 are shown to be attached to the decorative panel 246 by connectors 284 and bolts 285, although many alternative mounting methods are known in the art.

The airbag of the invention is a rigid expanding airbag with an attached inflator. The airbag may be suited for use as a knee bolster, and is preferably positioned under the steering wheel/column of a car, in an interior panel of a vehicle such as the glove box door, or in a lower section of the instrument panel of a vehicle directly in front of the occupant's lower legs. The airbag deploys in response to the detection of a collision event by an accelerometer. The knee airbag of the invention is preferably deployed in coordination with a primary airbag. After the deployment of the airbags, the inertia of the vehicle occupant carries the occupant into the primary airbag. Typically, the knee airbag is deployed prior to the primary airbag due to its smaller size. The knee airbag extends toward the occupant's legs and starts to absorb energy. This limits the forward translation of the occupant's lower body. The occupant's lower body then starts to rotate about the occupant's hips in a motion that enhances the primary airbag's ability to absorb energy.

The rigid inflatable airbag of the invention may additionally be used to protect a vehicle occupant from injury in side-impact collisions. To provide such protection, the airbag would be mounted in a door or side panel of a vehicle to allow deployment toward the side, including the sides of the legs, hips, arms, shoulders, and head of a vehicle occupant. Alternatively, the rigid inflatable airbag of the invention may be placed in a vehicle to prevent foot intrusion during a collision event. For this use, the airbag may be placed in a region of the vehicle such as the floorboards.

In vehicles equipped with the rigid knee airbag, the airbag deploys into the path of the knees of the occupant. During deployment, the inflator initiates production of inflation gas that creates a high pressure inside the rigid bag, thus causing the bellows panel to unfurl. As the airbag expands, the decorative interior panel is displaced from its position in the dashboard and moved into place to function as a knee bolster.

The knee airbag helps keep the occupant in a position where the primary airbag functions properly. The expansion of the knee airbag helps to decelerate, and even stop, forward motion of the occupant's lower body. The airbag acts like a lap restraint seatbelt by stopping the forward motion of the vehicle occupant's lower body, absorbing considerable energy and thus reducing the possibility of injury to the occupant.

The rigid airbag comprises a front panel, a bellows panel, and a rear panel. These panels are comprised of a rigid material such that impact of the vehicle occupant with the airbag may cause deformation of the panels. The front panel of the airbag is preferably a relatively flat piece of sheet metal. The front panel is preferably constructed from steel of from about 26 to about 38 U.S. gauge, or approximately from about 0.018 inches to about 0.006 inches in thickness, though other suitable metals and thicknesses may be used.

The airbags may also include one or more panels made of a plastic such as nylon (polyamide). One suitable plastic is commonly sold under the trade name of ZYTEL® from DUPONT®. Other plastics such as members of the thermoplastic elastomer family of plastics could be used to mold the knee airbag. Use of materials such as plastics could allow reduction in the number of components. In some cases, use of materials such as plastics could allow one-piece construction of the airbag. Suitable materials could be thermoplastic alloys with a base material of styrene-butadiene-styrene family, under the trade name of KRATON®, manufactured by Shell Chemical Company.

In airbags including plastic, the panels may be from about 0.005–0.040 inches in thickness. The front panel of the airbag may be elliptical, circular, or even substantially rectangular. The other panels of the airbag may be configured to have the same shape.

Typically, the interior of a vehicle's cockpit has a sculpted shape. There are relatively few flat sections of the vehicle, with most regions being concave or convex. The front panel of the inflatable metal airbag of the invention may be shaped to match the contours of the cockpit of a vehicle. Further, the bellows panel can be made to conform to various shapes. Indeed, the invention allows flexibility of shape since the front and back panels can have completely different shapes. This still allows for durable attachment of the front panel to the bellows panel, and allows for better attachment to a molded decorative panel to be attached to the front panel. The front panel may additionally have attachment flanges or bosses for attaching the decorative interior panel to the airbag.

The airbag further comprises a bellows panel that provides for the expansion of the airbag. The bellows panel is preferably made of at least one sheet of a metal processed to have at least one accordion fold to allow the bellows panel to be folded compactly during storage, and then to inflate and expand upon activation of the inflator.

In manufacturing the bellows panel, flat sheet metal is first processed into an accordion, or serpentine, fold pattern, such that each fold doubles back on itself. The bellows panel has at least one such fold, and may have any desired number of such folds. In presently preferred embodiments of the airbag of the invention, the bellows panel has one to six accordion pleats. The sheets are next rolled into an oval, circular, or substantially rectangular shape if one sheet is used, or into the fractional components of the desired shape when multiple panels are used. The ends of the panel or panels are then operably fused to form at least one joint.

The bellows panel may be made up of a single sheet of a rigid material such as a metal or a plastic, or alternatively, of multiple sheets of the rigid material accordion-folded and joined at their peripheries. In bellows panels made up of multiple sheets of rigid material, each sheet is rolled or formed to make up a segment of the final elliptical, circular (cylindrical), or substantially rectangular shape with rounded corners. Such bellows panels may, for example, be composed of two arc-shaped portions joined at their ends to form an elliptical bellows panel. It may be advantageous for manufacturing purposes to construct the bellows panel out of four segments. These may include two substantially straight accordion-folded segments and two segments, each having two 90-degree curves such that when the straight segments were placed between the curve-cornered segments, a substantially rectangular bellows panel is formed, the bellows having rounded corners.

The bellows panel may have a width of from about 1 to about 12 inches. More preferably, the bellows panel has a width of from about 2 to about 8 inches. In presently preferred airbags, however, the bellows panel is from about 4 to about 6 inches.

The bellows panel of the airbag may be constructed of material substantially similar to that used to manufacture the front panel. Specifically, the bellows panel is preferably made of relatively flat sheet metal. The sheet metal may be from about 16 to about 38 U.S. standard gauge, or more preferably, about 30 U.S. standard gauge. The bellows panel is preferably constructed from steel, though other suitable metals and rigid materials such as aluminum or plastic may be used. The bellows panel is preferably constructed so as to have one layer as in FIGS. 4A, 4B, but may alternatively have a second layer. Each of these layers may be composed of a rigid material of the same or different thickness or rigidity.

The rigid airbags of the invention also have a rear panel that serves as a base for the airbag. The rear panel is also constructed of a rigid material such as a metal or plastic, but is preferably of a slightly thicker sheet of rigid material than either the front panel or the bellows panel. This added thickness makes the rear panel more rigid. This rigidity allows the rear panel to be used to mount the airbag directly to the vehicle with or without the inclusion of mounting brackets, which must themselves be attached to the airbag. In addition, the thickness of the rear panel of the airbag renders the rear panel suitable for use as a reaction surface for the gas produced by the inflator to help direct the force of the gas in a forward motion. Though other thicknesses are suitable for the practice of the invention, the sheet of steel preferably used to produce the rear panel of the airbag of the invention is preferred to be of from about 26 to about 20 U.S. gauge (or approximately about 0.018 inches to about 0.035 inches).

The rigid construction of the airbag of the invention makes it suitable for direct mounting of a pyrotechnic inflator. The inflator assembly may be mounted directly to the rear panel of the airbag. Thus, the rear panel may have an inflator hole to allow a portion of the inflator, often including the diffuser section of the inflator, to be inserted into the airbag and to remain inside the airbag during use.

When the inflator is initiated, a heated flow of gas is produced and expelled directly into the airbag. Most fabric airbags are susceptible to damage from the heat of the gas. To avoid this, many fabric airbags include special heat-resistant coatings, or are positioned at a distance from the inflator, thus allowing the inflation gas to cool before entering the bag. In contrast, the rigid material such as metal used to construct the airbag of the invention is substantially undamaged by the heat of the gas flow.

In some cases, the rigid panels of the airbag may act as a heat sink for the inflation gas from the inflator. This allows the inflator to be simplified in construction. Specifically, as noted above, the heat generally associated with the initiation of a pyrotechnic inflator must be dissipated to protect fabric airbags. Thus, such inflators generally include baffles, filters, and other heat-conducting members to function as heat sinks for the heated inflation gas produced by the inflator. In the airbag system of the invention, however, such baffles and filters may be omitted, thus saving expense.

The airbag may be assembled using a variety of methods. The rigid airbags of the invention are preferably assembled using spot welding methods. Spot welds may be placed at intervals around the outer edges of the front and rear panels and around the top and bottom edges of the bellows panel of the airbag. The spot welds may have a diameter of from about 0.10 to about 0.5 inches, from about 0.12 to about 0.3 inches, or most preferably of 0.125 inches. A distance of from about 0.5 inches to about 2.0 inches, or more preferably of about 1.0 inch may separate the spot welds. Testing has shown that the gas pressure leakage between the spot welds does not adversely affect the expansion and energy absorption abilities of the inflatable metal airbag of the invention.

The airbag may also be assembled using brazing. In brazing, the three panels are tacked together with rings of brazing material in the joints. The airbag is then sent through a brazing oven to join the components. After assembly by brazing, spot welding, or other suitable methods, the entire airbag assembly is then compressed to a thickness of from about 0.25 to about 0.75 inches.

The airbag assembly may be installed in the knee bolster area of either the driver or passenger side of a vehicle. A driver's side airbag system could be installed by attaching the airbag system to the cross car beam of the vehicle. At least one mounting bracket affixed to the rear panel of the airbag may be used to secure the airbag. A similar installation method could be used for a passenger-side installed airbag system.

The passenger-side knee airbag may also be installed into a glove box door. Packaging a standard fabric airbag cushion into a glove box door is difficult. Since the decorative cover of the glove box door is often separated from the main structure of the box, it is extremely difficult to insert and attach a flexible fabric bag between the box and decorative cover. The airbag could be mounted to the glove box itself or the glove box door, and then have a decorative door panel mounted to the front panel. The airbag would be usable with skin and foamed decorative glove box door covers, thus requiring little or no modification to current doors. When the knee airbag is mounted in a glove box door, the door must be closed when the airbag is activated. Sensors may be placed in the glove box to detect whether the glove box door is closed. The sensors and airbag system could then be operably connected to a controller that could block activation of the airbag if the glove box door is open. Such sensors could also warn the driver that the glove box door is open, and that as a result, protection to the passenger will be compromised. The driver could also be alerted to close the glove box door if opened during operation.

The present invention may be embodied in other specific forms without departing from its structures, methods, or other essential characteristics as broadly described herein and claimed hereinafter. The described airbags, systems, and methods are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflatable airbag comprising:
    a front panel, a rear panel having an inflation orifice, and an extensible bellows panel disposed between said front panel and said rear panel, wherein each of said panels comprises a substantially rigid material.

2. The inflatable airbag of claim 1, wherein the substantially rigid material is metal or plastic.

3. The inflatable airbag of claim 1, wherein the front panel further comprises a decorative cover panel for use as a knee bolster.

4. The inflatable airbag of claim 3, wherein the decorative cover panel is a glove box door.

5. The inflatable airbag of claim 3, wherein the decorative cover panel is a contoured panel suitable for placement under the steering column of a vehicle.

6. The inflatable airbag of claim 1, wherein the bellows panel comprises at least one accordion fold.

7. The inflatable airbag of claim 6, wherein the bellows panel comprises more than one accordion fold.

8. The inflatable airbag of claim 6, wherein the bellows panel comprises at least two rigid sheets having at least one accordion fold, wherein the sheets are operably joined to form an annulus.

9. The inflatable airbag of claim 1, wherein the rear panel has a thickness greater than a thickness of the front panel.

10. The inflatable airbag of claim 9, wherein the rear panel has a thickness greater than a thickness of the bellows panel.

11. The inflatable airbag of claim 1, wherein the rear panel further comprises connector studs for attaching an inflator to the airbag.

12. The inflatable airbag of claim 11, wherein the rear panel further comprises a mounting bracket for mounting the airbag to a vehicle for use.

13. The inflatable airbag of claim 1, wherein the shape of the airbag is selected from the group consisting of oval, circular, and rectangular.

14. The inflatable airbag of claim 1, wherein the airbag is configured to be positioned in a vehicle to protect a vehicle occupant's lower legs when deployed.

15. The inflatable airbag of claim 1, wherein the airbag is configured to be positioned in a vehicle to protect a vehicle occupant during a side-impact collision when deployed.

16. The inflatable airbag of claim 1, wherein the airbag is configured to be positioned in a vehicle to prevent foot intrusion by a vehicle occupant's feet when deployed.

17. An inflatable airbag comprising:
    a front panel, a rear panel having an inflation orifice, and an extensible bellows panel disposed between said front panel and said rear panel, wherein the front panel further comprises a decorative cover panel for use as a bolster for a vehicle occupant, and wherein the front, rear, and extensible bellows panels comprise a substantially rigid material.

18. The inflatable airbag of claim 17, wherein the decorative cover panel is a glove box door.

19. The inflatable airbag of claim 17, wherein the decorative cover panel is a contoured panel suitable for placement under the steering column of a vehicle.

20. The inflatable airbag of claim 17, wherein the bellows panel comprises at least one accordion fold.

21. The inflatable airbag of claim 17, wherein the bellows panel comprises at least four accordion folds.

22. The inflatable airbag of claim 17, wherein the bellows panel comprises at least two metal sheets having at least one accordion fold, wherein the sheets are operably joined to form an annulus.

23. The inflatable airbag of claim 17, wherein the rear panel has a thickness greater than a thickness of the front panel.

24. The inflatable airbag of claim 17, wherein the rear panel has a thickness greater than a thickness of the bellows panel.

25. The inflatable airbag of claim 17, wherein the rear panel further comprises a ring of connector studs for attaching an inflator to the airbag.

26. The inflatable airbag of claim 17, wherein the rear panel further comprises a mounting bracket for mounting the airbag to a vehicle for use.

27. The inflatable airbag of claim 17, wherein the shape of the airbag is selected from the group consisting of oval, circular, and rectangular.

28. The inflatable airbag of claim 17, wherein the airbag is substantially constructed of metal.

29. The inflatable airbag of claim 17, wherein the airbag is substantially constructed of plastic.

30. An inflatable airbag system comprising:
    an inflatable airbag comprising a front panel, a rear panel having an inflation orifice, and an annular, accordion-folded bellows panel connected to the front panel and the rear panel, wherein the panels comprise a substantially rigid material; and
    an inflator attached to the inflation orifice of the back panel of the inflatable airbag, the inflator capable of expelling inflation gas sufficient to inflate the airbag upon activation; wherein when the inflatable airbag system is mounted in a vehicle and inflated, a vehicle occupant positioned near the airbag is decelerated by deformation of the airbag.

31. The inflatable airbag system of claim 30, wherein the bellows panel comprises at least one accordion fold.

32. The inflatable airbag system of claim 30, wherein the bellows panel comprises at least two accordion folds.

33. The inflatable airbag system of claim 30, wherein the bellows panel comprises at least two sheets of said substantially rigid material having at least one accordion fold, wherein the sheets are operably joined to form an annulus.

34. The inflatable airbag system of claim 30, wherein the rear panel has a thickness greater than that a thickness of the front panel.

35. The inflatable airbag system of claim 34, wherein the rear panel further comprises a ring of connector studs for attaching the inflator to the airbag.

36. The inflatable airbag system of claim 34, wherein the rear panel further comprises a mounting bracket for mounting the airbag to a vehicle for use.

37. The inflatable airbag of claim 30, wherein the shape of the airbag is selected from the group consisting of oval, circular, and rectangular.

38. The inflatable airbag system of claim 30, wherein the front panel further comprises a decorative molded cover panel for integration into a vehicle interior; wherein the decorative cover panel functions as a knee bolster.

39. The inflatable airbag system of claim 38, wherein the decorative cover panel is a contoured panel suitable for placement under the steering column of a vehicle.

40. The inflatable airbag system of claim 38, wherein the decorative cover panel is a glove box door.

41. The inflatable airbag system of claim 40, wherein the airbag further comprises a sensor to detect whether the glove box door is closed or open.

42. The inflatable airbag system of claim 41, wherein the airbag further comprises a controller operably linked to the sensor and the inflator such that when the sensor detects an open glove box door, the controller prevents the inflation of the airbag.

43. The inflatable airbag system of claim 30, wherein the inflator is selected from the group consisting of pyrotechnic, hybrid, and compressed gas inflators.

44. An inflatable knee airbag system comprising:
an inflatable knee airbag having a front panel configured to be attached to a decorative cover panel, an annular accordion-folded bellows panel attached to the front panel, and a rear panel having an inflation orifice and mounting brackets, the rear panel also being attached to the bellows panel, wherein the front, bellows, and rear panels comprise a substantially rigid material;
an airbag inflator attached to the inflation orifice of the rear panel of the knee airbag, the airbag inflator capable of expelling inflation gas sufficient to inflate the knee airbag upon activation; and
a decorative cover panel attached to the front panel of the knee airbag.

45. The inflatable knee airbag system of claim 44, wherein the bellows panel has at least one accordion fold.

* * * * *